United States Patent [19]

Greinke et al.

[11] Patent Number: 5,756,062
[45] Date of Patent: May 26, 1998

[54] CHEMICALLY MODIFIED GRAPHITE FOR ELECTROCHEMICAL CELLS

[75] Inventors: Ronald Alfred Greinke, Medina; Irwin Charles Lewis, Strongsville, both of Ohio

[73] Assignee: Ucar Carbon Technology Corporation

[21] Appl. No.: 654,660

[22] Filed: May 29, 1996

[51] Int. Cl.$^6$ .................................................. C01D 3/00
[52] U.S. Cl. .................... 423/449.4; 423/448; 423/449.1; 423/449.3; 429/122; 429/218; 429/224; 204/291; 204/294
[58] Field of Search .................................. 429/218, 224, 429/122; 423/445 R, 447.1, 447.3, 448, 449.1, 449.3, 449.4; 204/291, 294

[56] References Cited

U.S. PATENT DOCUMENTS

| | | |
|---|---|---|
| 4,132,837 | 1/1979 | Soffer ........................... 429/194 |
| 4,945,014 | 7/1990 | Miyabayashi et al. III ........... 429/218 |
| 5,028,500 | 7/1991 | Fong et al. II ..................... 429/194 |
| 5,069,683 | 12/1991 | Fong et al. I. ..................... 29/623.1 |
| 5,130,211 | 7/1992 | Wilkinson et al. ................. 429/198 |
| 5,162,170 | 11/1992 | Miyabayashi et al. ................ 429/94 |
| 5,176,969 | 1/1993 | Miyabayashi et al. ............... 429/212 |
| 5,358,802 | 10/1994 | Mayer et al. ..................... 429/218 |
| 5,622,793 | 4/1997 | Iijima et al. ..................... 429/218 |

FOREIGN PATENT DOCUMENTS

| | | |
|---|---|---|
| 0520667A1 | 12/1992 | European Pat. Off. . |
| 0613197A1 | 8/1994 | European Pat. Off. . |

OTHER PUBLICATIONS

Filming Mechanism of Lithium–Carbon Anodes in Organic and Inorganic Electrolytes, J.O. Besenhard et al, Journal of Power Sources 54, (1995), no month available pp. 228–231 (Besenhard et al).

Lithium Manganese Oxide (Li Sub 1+X MN204)/Carbon Rocking–Chair System: a Review, by Tarascon, J.M. et al, Electrochim. Acta, 38:1221–1231, No. 9, 1993, (Tarascon et al). no month available.

Carbonaceous Materials as Lithium Intercalation Anodes, by T.D .Tran et al, The Electrochemical Society Proceedings, vol. 94–28, (Tran et al). no month or year available.

Reactivity of Lithium Intercalated into Petroleum Coke in Carbonate Electrolytes, by M. Jean et al, Electrochemical Science and Technology, vol. 143, No. 2, Feb. 1996 (Jean et al).

Processing and Characterization of Carbon Electrodes for Li Ion Batteries, by X. Chu et al., The Electrochemical Society Proceedings, vol. 94–28, (Chu et al). no month/year available.

Lithium Polymer Electrolyte Rechargeable Battery, by D. Fauteux, The Electrochemical Society Proceedings, vol. 94–28 (Fauteux) no month/year available.

The Dependence of the Performance of Li–C Intercalation Anodes for Li–Ion Secondary Batteries on the Electrolyte Solution Composition, by Ein–Eli et al, Electrochimica Acta, vol. 39, pp. 2559–2569, 1994 (Ein–Eli et al). no month available.

Inhibition of the Air Oxidation of Large Specimens of Graphite with Phosphorus Oxychloride, by P. Hawtin et al., Proc. 3rd Conf. Industrial Carbon and Graphite, S.C.I., London, 1970 p. 147 (Hawtin et al), no month available.

Anodic Oxidation of Propylene Carbonate and Ethylene Carbonate on Graphite Electrodes., by M. Arakawa et al. 1995 Elsevier Science S.A., Journal of Power Sources 54, pp. 250–254 (Arakawa et al). no month available.

Aspects of Carbon Materials as Negative Electrodes for Lithium Secondary Batteries, by K. Tatsumi et al, Osaka Kogyo Gijutsu Shikensho Kiho (Bulletin of the Govern. Ind. Res. Institute, Osaka) 42(3) 150, 1991 (Tatsumi et al). no month available.

Technological Advances, 1993 Elsevier Science Publishing Co., Mat Tech 1993, 8:39–45, (Technological Advances). no month available.

Studies of the Electrochemical Intercalation of Lithium into Various Carbons, by C. Beck et al, Carbon '92, 5. International Carbon Conference, Jun. '92, (Beck et al).

Anodic Behavior of Carbon Materials in Various Aprotic Solvents, Proceedings of the Symposium on "New Sealed Rechargeable Batteries and Super Capacitors", O. Yamamoto, Y. Takeda, N. Imanishi, R. Kanno, vol. 93–23, p. 302, 1993 (Yamamoto et al). no month available.

N. Imanishi, H. Kashiwagi, T. Ichikawa, Y. Takeda, and O. Yamamoto, J. Electrochem. Soc., p. 315, 1993 (Imanishi et al) no month available.

Correlation Between the Surface Chemistry and the Performance of Li–Carbon Intercalation Anodes for Rechargeable "Rocking–Chair" Type Batteries, D. Aurbach, Y. Ein–Eli, O. Chusid (Youngman), Y. Carmeli, M. Babai, and H. Yamin, J. Electrochem. Soc, vol. 141, p.603, 1994 (Aurbach et al I) no month available.

(List continued on next page.)

*Primary Examiner*—Bruce F. Bell
*Attorney, Agent, or Firm*—Frederick J. McCarthy

[57] ABSTRACT

This invention relates to chemically modified graphite particles:
(a) that are useful in alkali metal-containing electrode of a electrochemical cell comprising:
 (i) the electrode,
 (ii) a non-aqueous electrolytic solution comprising an organic aprotic solvent which solvent tends to decompose when the electrochemical cell is in use, and an electrically conductive salt of an alkali metal, and
 (iii) a counterelectrode; and
(b) that are chemically modified with fluorine, chlorine, iodine or phosphorus to reduce such decomposition.

This invention also relates to electrodes comprising such chemically modified graphite and a binder and to electrochemical cells containing such electrodes.

21 Claims, 3 Drawing Sheets

OTHER PUBLICATIONS

Electrochemical and Spectroscopic Studies of Carbon Electrodes in Lithium Battery Electrolyte Systems, O. Chusid, Y. Ein Ely, D. Aurbach, M. Babai, and Y. Carmeli, J. of Power Sources, vol. 43, p. 47, 1993 no month available (Chusid et al).

Study of Electrolyte Solutions Based on Ethylene and Diethyl Carbonates for Rechargeable Li Batteries, D. Aurbach, Y. Ein–Eli, B. Markovsky, A. Zaban, S. Luski, Y. Carmeli, and H. Yamin, J. Electrochem. Soc., vol. 142, p. 2882, 1995 (Aurbach et al II) no month available.

Effects of Crown Ether Addition to Organic Electrolytes on the Cycling Behavior of the $TiS_2$ Electrode, M. Morita, H. Hayashida, and Y. Matsudo, J. Electro. Soc., 134, 2107 1987 (Morita et al) no month available.

Mechanism Leading to Irreversible Capacity Loss in Li Ion Rechargeable Batteries, Y. Matsumura, S. Wang, J. Mondori, J. Electrochem. Soc., vol. 142, p. 2914, 1995 (Matsumura et al). no month available.

Catalyzed Gasification Reactions of Carbon, D. McKee. In Chemistry and Physics of Carbon, vol. 16, p. 1, Edited by P.L. Walker, Jr. and P.A. Thrower, Marcel Dekker, Inc., New York (McKee). no month/year available.

"Heat Transfer Phenomena in Lithium/Polymer–Electrolyte Batteries for Electric Vehicle Application," by Yufei Chen and James W. Evans, J. Electrochem. Soc., vol. 140, No. 7, Jul. 1993, 1833–1838.

Fig. 3

CHEMICALLY MODIFIED GRAPHITE FOR ELECTROCHEMICAL CELLS

GOVERNMENT CONTRACT

The work described and claimed in this patent application was conducted under Cooperative Agreement No. DE-FC02-91CE50336 with the Department of Energy of the United States of America.

BACKGROUND OF THE INVENTION

1. Field of the Invention

This invention relates to the field of electrochemical cells, and in particular to the field of carbon-containing electrodes for such electrochemical cells.

2. Description of Related Art

Electrochemical cells useful for electrical storage usually incorporate a metal-containing anode and a cathode including an electrochemically active material which can take up ions of the metal. An electrolyte containing ions of the metal is placed in contact with the anode and the cathode. During discharge of the cell, metal ions leave the anode, enter the electrolyte and are taken up in the active material of the cathode, resulting in the release of electrical energy. Provided that the reaction between the metal ions and the cathode-active material is reversible, the process can be reversed by applying electrical energy to the cell. If such a reversible cathode-active material is provided in a cell having the appropriate physical configuration and an appropriate electrolyte, the cell can be recharged and reused. Rechargeable cells are commonly referred to in the electrochemical cell art as "secondary" cells.

Various proposals have been made for increasing the energy densities of electrochemical cells through the application of highly reactive metals (e.g., the alkali metals) as anodic materials. Lithium metal has received the most attention in this regard due to its very low atomic weight and because it is the most electronegative of all the metals. Electrochemical cells containing lithium or other alkali metal anodes cannot employ aqueous and other active hydrogen-containing electrolytes since contact of these metals with such electrolytes would result in oxidation of the latter and evolution of hydrogen gas. Accordingly, electrochemical cells of this type which are intended for service at ambient temperatures are provided with non-aqueous electrolytic solutions in which electrically conductive salts are dissolved in organic aprotic solvents. Among the numerous electrically conductive salts which have heretofore been employed in non-aqueous electrolytic solutions are the alkali metal salts of such anions as the halides, halates, perhalates, haloaluminates, haloarsenates, halophosphates, haloacetates, phosphates, thiocyanates, sulfides, sulfates, cyanides, picrates, acetylacetonates, fluoroborates, hydrides, borohydrides, and so forth. These electrically conductive salts have been dissolved in a wide variety of organic aprotic solvents including Lewis bases such as the tertiary amines; amides and substituted amides such as formamide; nitriles such as acetonitrile, propionitrile and benzonitrile; open chain and cyclic esters such as propylene carbonate, alkyl acylates and butyrolactone; oxysulfur compounds such as dimethylsulfoxide, dimethylsulfite and tetramethylene sulfone; and, open chain and cyclic ethers such as the poly (alkyleneoxy) glycols, dioxane and the substituted dioxanes, dioxolane, tetrahydrofuran and tetrahydropyran.

The use of non-aqueous electrolytic solutions does not eliminate all problems associated with the use of lithium metal in the anodes of electrochemical cells. For example, the problem of avoiding contact of the lithium metal with moisture during assembly of the cell remains. Hence, efforts have been made to develop a rechargeable lithium cell containing no metallic lithium. As a result of such efforts, cells have been developed using, instead of a lithium metal anode, an anode comprising lithium intercalated in a material (an "intercalation host") that operates near the potential of lithium (see U.S. Pat. No. 5,069,683).

Intercalation involves the formation of secondary chemical bonds (van der Waals forces) between the lithium atoms and the atoms of the intercalation host. Graphite and coke are known intercalation hosts for lithium. In highly graphitized graphite, each lithium atom is associated via van der Waals bonds with six carbon atoms of the crystalline graphite structure. Such "$LiC_6$" combinations are regarded as the ideal for lithium intercalation in carbon. During cell operation, the lithium is released from the intercalation host. It is also known to employ a cathode material (e.g., crystalline manganese dioxide) that can also reversibly incorporate lithium. Cells wherein both electrodes can reversibly incorporate lithium are known as "rocking chair" (or "lithium ion") batteries. They have been called the rocking chair batteries because lithium ions "rock" back and forth between the electrodes during the charge/discharge cycles.

The output voltage of cells of the rocking chair type is determined by the difference between the electrochemical potential of lithium within the two electrodes. It is important to have, as the positive and negative electrodes, cheap materials which can reversibly intercalate (or otherwise retain) lithium at high and low voltages, respectively. Among the materials proposed for replacement of lithium metal are $WO_2$, $MoO_2$, $Mo_6Se_6$ or carbon (e.g., coke or graphite), with the latter providing the best compromise between large specific capacity and reversible cycling behavior. However, in rocking chair cells a price is paid in terms of average output voltage and energy density when compared to a lithium metal cell; thus strongly oxidizing compounds (i.e., compounds which reversibly incorporate lithium above 4 volts) must be used as the positive electrode. $LiNiO_2$, $LiCoO_2$, and $LiMn_2O_4$ satisfy this requirement. These lithium-bearing positive electrode materials are not moisture sensitive and can be handled in ambient atmospheres as can lithium free carbon negative electrode materials. The rocking chair (or lithium-ion cell) is assembled in its discharged state, where the output voltage is close to zero. As with the Ni-Cd cells, the rocking chair cells need to be charged prior to use. [see Lithium Manganese Oxide ($Li_{1-x}Mn_2O_4$)/Carbon Rocking-Chair System: A Review, J. M. Tarascon, Electrochim.Acta, 38:1221–1231 (No. 9, 1993)].

Replacing lithium metal anodes with lithium/intercalation host anodes removes the restrictions lithium metal places upon cell design and choice of electrolytes and also the adverse effect lithium metal places upon cycling performance and safety in the finished cell. In particular, highly graphitic carbonaceous materials are very suitable lithium intercalation hosts because highly graphitic carbonaceous materials (particularly graphite) are inexpensive, non-toxic and are capable of incorporation into electrochemical cells having relatively high specific capacities.

Ideally, the organic aprotic solvent selected for use in non-aqueous electrolytic solutions in cells having lithium/ graphite anodes should combine good solvency for the electrically conductive solute (to permit high levels of ionic conductivity) with long term stability in contact with the anode. In practice, the properties are inherently opposed to each other. The electrolyte 'solvents of high solvency, (i.e., the polar solvents) are the least stable in contact with the alkali metals. Thus, the polar solvents decompose on the surface of the graphite in lithium/graphite anodes resulting in gas formation, low first cycle coulombic efficiencies and high fade rates of the capacity during the cycling of the electrochemical cell. On the other hand, the solvents of high stability (i.e., non-polar solvents such as the aromatic hydrocarbons) have the poorest solvency for the electrically conductive salts. One possible mechanism which would explain the poor stability of organic aprotic solvent toward alkali metals is that the cation of the electrically conductive salt dissolved in the solvent behaves as a Lewis acid catalyst through association with the electronegative element of the solvent. Such association is thought to result in a shift of negative charge to the cation rendering the electronegative element and the carbon atom adjacent to it more positive. This in turn facilitates the electron transfer to the solvent molecule and the production of an anion radical as the initial step in the solvent decomposition process. Regardless of the precise nature by which the polar aprotic solvents are eventually degraded, the fact remains that the usefulness of these solvents in high energy electrochemical cells is limited by their tendency to undergo decomposition in the presence of alkali metal anodes (e.g., lithium/graphite anodes).

Graphite particles resemble flat platelets (flat lamellae) with well-defined basal planes (see "Carbonaceous Materials as Lithium Intercalation Anodes", T. D. Tran, J. H. Feikert, S. T. Mayer, Chemistry and Materials Science, Lawrence Livermore National Laboratory, Livermore, Calif. 94550, X. Song, K. Kinoshita, Energy and Environmental Division, Lawrence Berkeley Laboratory, Berkeley, Calif. 94270, The Electrochemical Society Proceedings, Volume 94-28, 110–114). The edge planes of such platelets are known to be the most reactive sites in graphite (see O. Yamamoto, Y. Takeda, N. Imanishi, R. Kanno, "Anodic Behavior of Carbon Materials in Various Aprotic Solvents" in Proceedings of the Symposium on "New Sealed Rechargeable Batteries and Supercapacitors", Volume 93-23, p. 302, 1993, 183rd meeting of the Electrochemical Society, Honolulu, Hawaii). Another publication (N. Imanishi, H. Kashiwagi, T. Ichikawa, Y. Takeda, and O. Yamamoto, J. Electrochem. Soc., 140, (1993) p. 315) discloses that the decomposition of organic aprotic solvents in electrochemical cells containing lithium/graphite anodes occurs preferentially on the edge plane of graphite and not the basal plane.

Several approaches have been described in the literature for reducing the reactivity of graphite in lithium/graphite anodes to organic aprotic solvents including the use of macroheterocyclic compounds such as crown ethers [see U.S. Pat. Nos. 4,132,837 and 5,130,211 and M. Morita, et. al., J. Electrochem. Soc., Vol. 134 page 2107, 1987] and the introduction of gases such as carbon dioxide [see Aurbach et. al. J. Electrochem. Soc. Vol. 141, Page 603, 1994; M. Chusid, et. al., J. of Power Sources, 43, Page 47, 1993; and A. Aurbach, et. al, J. Electrochem. Soc., Vol. 142, page 2882, 1995]. The use of crown ethers has the disadvantage in that crown ethers are expensive and toxic while carbon dioxide involves the disadvantage of pressurizing the electrochemical cell. In addition, both approaches involved adding an extraneous material to the cell.

Hence, there is a need for further improvement in solvent stability in lithium/graphite electrochemical cells containing organic aprotic solvent solutions.

SUMMARY OF THE INVENTION

This invention relates to chemically modified graphite particles:

(a) that are useful in a alkali metal-containing electrode of a electrochemical cell comprising:
  (i) the electrode,
  (ii) an organic aprotic solvent solution containing an electrically conducting salt of an alkali metal, and an organic aprotic solvent which tends to decompose when the electrochemical cell is in use, and
  (iii) a counterelectrode
(b) that are chemically modified with fluorine, chlorine, iodine or phosphorus to reduce such decomposition.

This invention also relates to electrodes comprising such graphite and a binder and further relates to electrochemical cells containing such electrodes.

Electrochemical cells having electrodes containing chemically modified graphite particles of the present invention exhibit reduced decomposition of the organic aprotic solvent during discharge.

DETAILED DESCRIPTION OF INVENTION

Graphite Starting Materials

The chemically modified graphite particles of the present invention are produced from graphite starting materials that can be described as follows:

Graphite starting materials suitable for use in producing the chemically modified particles of the present invention include highly graphitic carbonaceous materials capable of reversibly intercalating alkali metals. These highly graphitic carbonaceous materials have a degree of graphitization above about 0.80 and most preferably about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous anode materials include synthetic graphites and natural graphites from various sources, as well as other carbonaceous materials such as petroleum cokes heat treated at temperatures above 2500° C., carbons prepared by chemical vapor deposition or pyrolysis of hydrocarbons and the like.

The graphite starting materials used in the present invention may contain non-carbon components so long as the crystal structure of the starting materials maintains the required degree of graphitization. Generally, any carbon-containing material, the crystal structure of which possesses the required degree of graphitization, is suitable for use with the present invention. Such graphite preferably has an ash content of less than six weight percent.

The graphite starting materials are milled to produce graphite particles suitable for use in the electrodes of the present invention. The milling of the graphite starting materials can be conducted by any suitable process (e.g. attrition, ball or jet milling) in air or in an inert atmosphere at room temperature. The milling is conducted to produce graphite particles of a suitable average size, e.g., from 2 microns to 40 microns (preferably from 3 microns to 10 microns) with essentially no particles greater than 50 microns (e.g., less than 15 weight percent—and preferably less than 5 weight percent—of the graphite particles are greater than 50 microns). The presence of substantial amounts of large graphite particles (particles greater than about 50 microns) is undesirable since it impedes electrochemcial performance. These large particles prevent the formation of the desired uniform thin coating of the graphite on the substrate (e.g., foil) usually employed in fabricating the electrode and can result in electrochemical shorting and premature failure of the cell. Then, the graphite particles are calcined under suitable conditions (e.g., heating at 500° C. to 1200° C. in an inert atmosphere) to produce graphite particles having hydrophobic and reactive surfaces suitable for chemical modification in accordance with the present invention as described below.

Chemical Modification

In accordance with the present invention, suitable graphite particles as described above are modified by reacting the graphite particles with a chemical compound or with a mixture of chemical compounds (herein referred to as a "chemical modifier") capable of chemically bonding fluorine, chlorine, iodine or phosphorus to the graphite particles. Suitable chemical modifiers for bonding fluorine to the graphite particles include fluorine gas. Suitable chemical modifiers for bonding chlorine include aqua regia (i.e., a mixture of water, HCl and $HNO_3$), NaOCl, chlorine gas and any other agent that generates chlorine. Suitable chemical modifiers for bonding phosphorus to the graphite particles include ammonium dihydrogen phosphate ($NH_4H_2PO_4$), $P_2O_5$, $POCl_3$, $H_3PO_4$ and $(NH_4)_2HPO_4$.

The manner in which the chemical modification of the graphite particles is conducted depends largely on the specific chemical modifier used in the particular case. Known methods for establishing chemical bonds between carbon and fluorine, chlorine, iodine and phosphorus are applicable to the practice of the present invention. By way of illustration, chlorine gas can be used at 25° C. to 100° C. without a solvent while liquid chlorinating agents (e.g., NaOCl) can be used at 10° C. to 80° C. in aqueous solution. Iodine gas or ICl an be used to bond iodine to the graphite particles. Preferably from 20 parts per million to 500 parts per million of fluorine, chlorine or iodine or from 300 parts per million to 5000 parts per million of phosphorus are chemically incorporated in the graphite particles. Such chemical modification occurs at the edge plane of the graphite particles. Bromine is not used as a chemical modifier in the present invention because it intercalates the graphite and so interferes with the intercalation of the alkali metal.

It is known to treat carbon monoliths (i.e., relatively large carbon artifacts such as crucibles and heat exchangers) with chlorine or phosphorus to inhibit oxidation (see Chemistry and Physics of Carbon, Ed. by Philip L. Walker, Jr. and Peter A. Thrower, Vol. 16, 28–29, Marcel Dekker, Inc. New York and Basel). Such treatment is distinct from the treatment of graphite particles in accordance with the present invention to reduce decomposition of electrolyte solvents.

Graphite Electrodes

The chemically modified graphite particles provided by the present invention are used to produce an electrode utilizing any of the components conventionally used to produce graphite electrodes for electrochemical cells. Typically, the graphite particles are used in conjunction with a binder. Suitable binders include (polyvinylidene fluoride) and ethylene-propylene-diene terpolymers. Suitable other ingredients include electrically conductive carbon. From 3 to 30 weight percent of the binder and from 0 to 10 weight percent (preferably from 2 to 6 weight percent) of the electrically conductive carbon can be used based on the weight of the graphite, binder and any electrically conductive carbon. The binders and electrically conductive carbons used in the electrodes of the present invention are the same binders and electrically conductive carbons used in known graphite electrodes. The graphite-binder-conductive carbon mixture can be used coated on a substrate (e.g., a metallic foil such as a copper, nickel or stainless steel foil). In the practice of the present invention, the above-mentioned components are formed into an electrode by any suitable means (e.g., by casting or hot pressing). The geometric structure of the graphite electrode can be cylindrical, rectangular or any other suitable shape.

Electrochemical Cells

Figure 1:
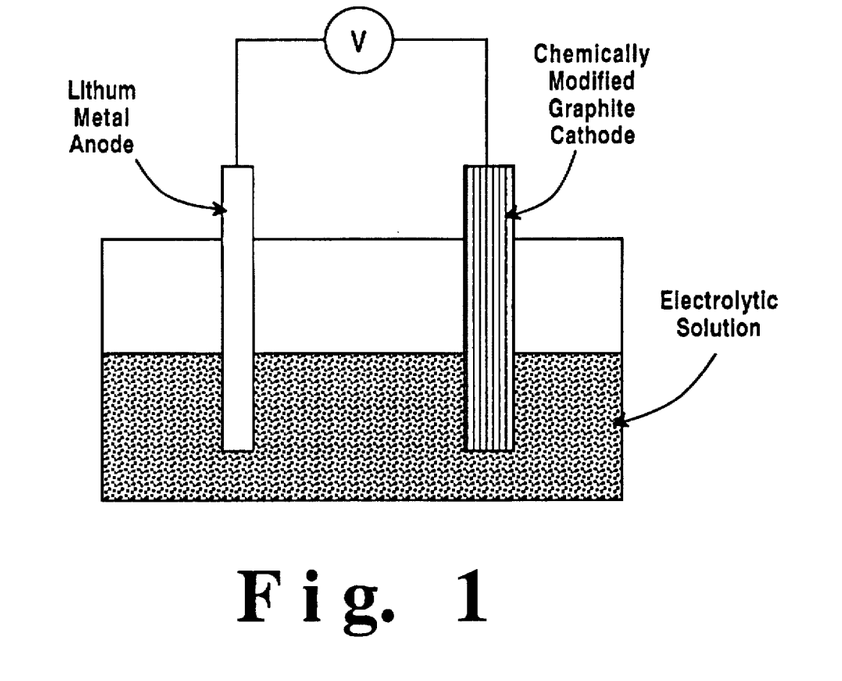
FIG. 1 shows an electrochemical cell in accordance with the present invention where the electrode of the present invention is the cathode.
Figure 2:
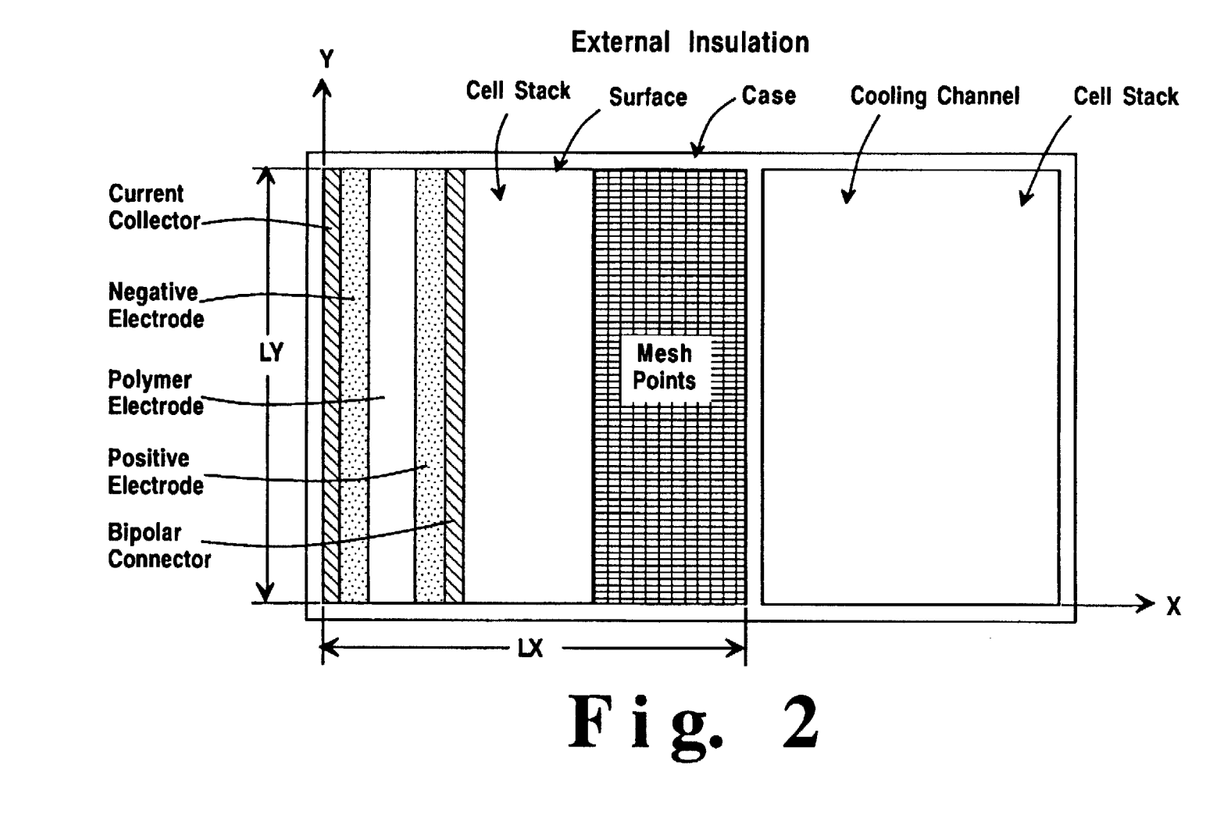
FIG. 2 shows an electrochemical cell of the present invention where the electrode of the present invention is the anode.

The graphite electrodes of the present invention are used in electrochemical cells comprising:

(a) a graphite electrode as described above, (b) a non-aqueous electrolytic solution comprising an organic aprotic solvent and an electrically conductive salt of an alkali metal, and (c) a counterelectrode Illustrative of such electrochemical cells are the electrochemical cells shown in FIGS. 1 and 2. These electrochemical cells are rechargeable (secondary) electrochemical cells.

The electrodes of this invention contain chemically modified graphite which reversibly intercalates alkali metals. Various of the materials useful in the counterelectrode (e.g., manganese dioxide) also reversibly intercalate alkali metals (or otherwise reversibly incorporate alkali metals in their crystalline structure, e.g., by van der Waals forces). When such electrodes and counterelectrodes are present in the electrochemical cells, the cells are of the "rocking chair" or "alkali metal ion" variety. Such cells are a preferred embodiment of the present invention.

Non-Aqueous Electrolytic Solutions

In the non-aqueous electrolytic solutions used in the electrochemical cells of the present invention, suitable electrically conductive salts include the alkali metal salts of halides, halates, perhalates, haloaluminates, haloarsenates, halophosphates, haloacetates, phosphates, thiocyanates, sulfides, sulfates, cyanides, picrates, acetylacetonates, fluoroborates, hydrides, borohydrides, and so forth. The electrolyte salt should be compatible with both the cathode-active material, the highly graphitic carbonaceous anode material and the sequestering agent. When the alkali metal is lithium, suitable lithium electrolyte salts include $LiMn_2O_4$, $LiCoO_2$, $LiNO_2$, $LiAsF_6$, $LiPF_6$, $LiClO_4$, $LiBF_4$, LiB $(C_4H_5)_4$, $LiCF_3SO_3$, $LiN_9CF_3SO_2)_2$, $LiSO_3F$, $LiAlCl_4$, LiBr, and mixtures thereof $LiAsF_6$, $LiMn_2O_4$, $LiCoO_2$ and mixtures thereof are preferred. Preferably, a 0.5 to 3.0 molar solution of the salts is employed.

In the non-aqueous electrolytic solutions used in the electrochemical cells of the present invention, suitable organic aprotic solvents include polymer electrolytes such as polyethylene oxide and polyacrylonitrile; Lewis bases such as the tertiary amines; amides and substituted amides such as formamide; nitriles such as acetonitrile, propionitrile and benzonitrile; open chain and cyclic esters such an alkylene carbonates (e.g., as propylene carbonate) and alkyl carbonates (e.g., diethyl carbonate), alkyl acylates and butyrolactone; oxysulfur compounds such as dimethylsulfoxide, dimethylsulfite and tetramethylene sulfone; and, open chain and cyclic ethers such as the poly (alkyleneoxy) glycols, dioxane and the substituted dioxanes, dioxolane, tetrahydrofuran and tetrahydropyran. Such non-aqueous electrolytic solutions can also contain optional components such as sequestering agents (e.g., glyme and crown ethers). Preferred non-aqueous electrolytic solutions used in the present invention comprise a lithium salt and at least one alkylene carbonate solvent.

Counterelectrodes

The counterelectrodes in the electrochemical cells of the present invention are selected so that there is a potential difference between the counterelectrode and the above-described electrode containing the chemically modified graphite. The electrode having the higher potential is the cathode.

Suitable counterelectrodes can be made from an electrically active material such as metal-chalcogen combinations, (particularly transition metal-chalcogen combinations), metal halides, and the like. Such chalcogens to include the chemically-related elements from Group VI of the periodic table, namely oxygen, sulfur, selenium, tellurium and polonium. Preferred transition metals include manganese, nickel, iron, chromium, titanium, vanadium, molybdenum and cobalt. Preferred electrically active materials for the counterelectrode include molybdenum sulfides, vanadium oxides and manganese oxides such as $MoS_2$, $V_6O_{13}$, $CoO_2$ or $MnO_2$. Preferably the counterelectrode is capable of intercalating or otherwise incorporating lithium into its crystalline lattice. Lithium metal can also be used as the counterelectrode.

The counterelectrode may include the above-described electrically-active material in particulate form with a suitable inner polymeric binder such as an ethylene-propylene-diene terpolymers ("EPDT"), a polyfluorinated hydrocarbon such as polytetrafluorethylene ("PTFE") or polyethylene oxide ("PEO"). Such binders are those used in known counterelectrodes. Preferably, about 4% by weight or less of the binder to counterelectrode material is used. This counterelectrode can also contain additives such as electrically conductive carbon.

Cell Fabrication

In assembling the electrochemical cells of the present invention, the counterelectrode can be fabricated by depositing a slurry of the active counterelectrode material, an electrically conductive inert material, a binder and a fugitive liquid carrier (such as cyclohexane), on a cathode current collector, and then evaporating the carrier to leave a coherent mass in electrical contact with the current collector.

Likewise, the electrode containing the chemically modified graphite in particulate form can be mixed with a suitable inert polymeric binder. Expansion and contraction of the electrode during cell cycling can cause the graphite particles to lose electrically conductive contact with one another. Conductivity can be similarly enhanced by adding an electrically-conductive material, such as carbon black, to the electrode. The electrode can be fabricated by depositing a slurry of the chemically modified graphite particles, an electrically-conductive inert material, a binder and a fugitive liquid carrier such as cyclohexane on an electrically-conductive anode support and then evaporating the carrier to leave a coherent mass in electrical contact with the support.

The electrodes and/or counterelectrodes in the cells of the present invention can be intercalated with an alkali metal by the means known in the art (e.g., by the means disclosed in U.S. Pat. No. 5,028,500 and European Patent Application O 474 183 A2—the disclosures of which are incorporated herein by reference). By way of illustration, the cathode-active material is non-lithiated or insufficiently lithiated, a sheet of lithium metal foil can be sandwiched between either the anode assembly or the cathode assembly and the porous separator.

A sheet of lithium foil can be placed between anode and separator so that the surface of the sheet is coextensive with the surface of the anode and the thickness of the sheet is chosen so that the correct amount of lithium is present for intercalation into the anode. The layered assembly can then be wound around the metallic center post to form a spiral assembly that is then placed into the cell container to which is added the electrolyte solution into which the sequestering agent has been dissolved. The cell container is then covered with the cell cap.

Electrode conductors for attachment to the anode and cathode are used in the electrochemical cells of the present invention. Among the satisfactory electrode conductors are tungsten, aluminum, stainless steel, steel, graphite, lead oxide, platinum, copper, nickel, silver, iron and brass.

Improvements

Electrochemical cells having electrodes containing the chemically modified graphite particles of the present invention exhibit reduced decomposition of the organic aprotic solvent during discharge.

The electrochemical volume capacity of the electrochemical cells of the present invention can be improved by the means described and claimed in the commonly assigned U.S. patent application Ser. No. 08/654,644 filed concurrently herewith in the names of Irwin Charles Lewis and Ronald Alfred Greinke, entitled "Compacted Carbon For Electrochemical Cell". The disclosure of said concurrently filed Union States patent application is incorporated herein by reference.

The following Examples illustrate the present invention.

EXAMPLE 1

A. A high purity natural graphite powder with an average particle size of 34 microns was heated to 1000° C. under argon to create a basic and hydrophobic surface containing active sites that can be stabilized with chemical reagents.

B. Then the heated sample (75 grams) of the graphite powder was treated with a solution of aqua regia (500 milliliters of water, 50 milliliters of 38% HCl and 50 milliliters of 70% $HNO_3$) to generate surface chlorine groups on the active edge planes of the graphite. After an additional heat treatment at 1000° C. to remove any trace amounts of excess reagents, the treated graphite contained about 35 parts per million of "stable" chlorine (i.e., chlorine that was not removed by the solution or heating ) as measured by x-ray fluorescence.

C. The electrochemical cell used in this example is shown in FIG. 1. The cells for testing were constructed using metallic lithium foil as the anode and the graphite powder produced in Part B above of this Example as the cathode. The electrolyte consisted of 1 Molar $LiPF_6$ in 50% by weight diethyl carbonate and 50% by weight ethylene carbonate as solvent. The graphite powder was cast into a film on to a nickel foil using a slurry of the carbon with 5% by weight of a polyvinylidene fluoride ("PVDF") binder and 4% by weight non-intercalating electrically conductive carbon black (commercially available as "Super S") in cyclohexane. The film coating was adjusted to give 3 to 8 milligrams per square centimeter of dried electrode coating. The coating was dried by heating to 200° C. for 2 hours and then kept at 100° C. prior to use. The total electrode area was 5 square centimeters. The cells were cycled at a constant current between the potential limits of +2.5 volts and 0.00 volts. The discharge curves which represent the intercalation of the lithium into carbon and the charge curves which represent the deintercalation were measured over five cycles. The cells were tested and the results are described in Example 3 below.

EXAMPLE 2

Another portion of the graphite produced as described in Part A of Example 1 above was treated with a solution of ammonium dihydrogen phosphate for one hour at room temperature. In this treatment, approximately 0.195 gram of $NH_4H_2PO_4$ in 200 milliliters of $H_2O$ was added to 75 grams of natural graphite. After an additional heat treatment at 1000° C. to remove any trace amount of excess reagents, the treated graphite contained about 3000 parts per million of stable phosphorus. The phosphorus modified graphite was used to form the cathode of a cell as described in Example 1 above. The cell was tested and the results are described in Example 3 below.

EXAMPLE 3

A. The electrochemistry of: (1) an oxidized graphite (produced as described below in Part B of this Example), (2) a graphite modified with phosphorus (produced as described in Example 2 above), and (3) a graphite modified with chlorine (produced as described in Example 1 above) were evaluated in the test cell described in Example 1 above. The electrochemistry of electrodes made from these modified graphites was compared to that of (4) an electrode made from an untreated graphite.

B. To effect the oxidation of the graphite powder, the graphite powder was placed in a tumbling furnace and air oxidized at 650° C. for two hours. The oxidation resulted in a 14% weight loss of the graphite. The oxidized graphite was used to produce an electrode as described in Example 1 above.

Figure 3:
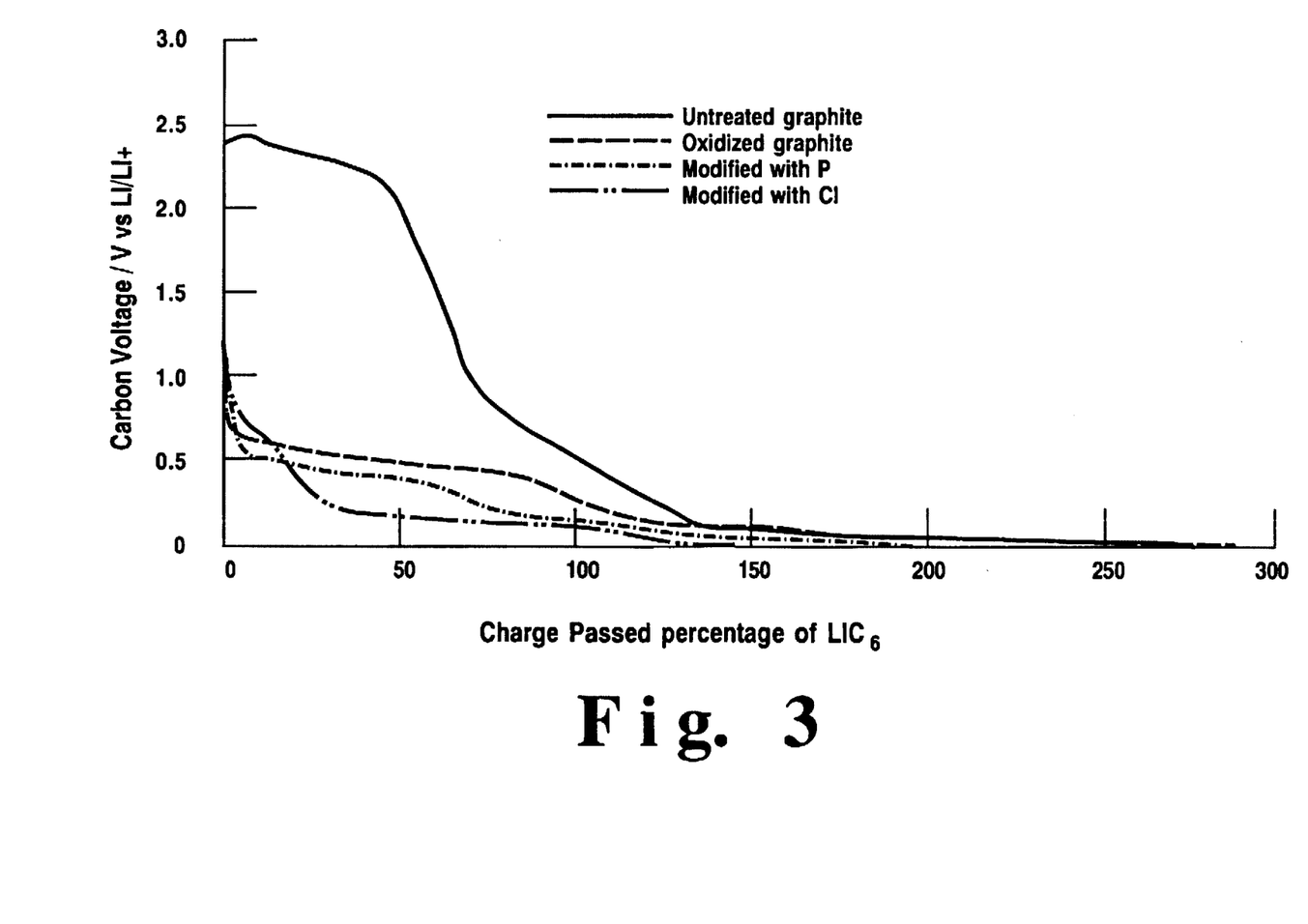
FIG. 3 shows an initial charge/discharge curves illustrating the performance of two electrochemical cells of the present invention and the performance of two comparative electrochemical cells.

C. All four graphite electrodes were tested in the cell described in Example 1 above and the results are shown in FIG. 3. In FIG. 3, the "y" axis is the potential difference between the carbon and the lithium couple (Li/Li$^+$). The "x" axis is the amount of charge passed in the cell during the first intercalation cycle calculated as the percentage of the intercalated compound, $LiC_6$. The amount of charge passed is always greater than 100% of $LiC_6$. Values above 100% indicate that unwanted solvent (EC-ethylene carbonate and DEC-diethyl carbonate) decomposition reactions have occurred during the intercalation of the carbon. The intercalation of the carbon only occurs at carbon voltages of 0.2 or lower. Above 0.2 volts, the undesirable solvent decomposition reactions are occurring.

For the untreated graphite, the total charge passed during intercalation was equivalent to 270% of $LiC_6$, a value indicating that the amount of undesirable gassing reactions of the solvent is equivalent to 170% of $LiC_6$ (270−100). For the oxidized graphite, the charge passed during graphite intercalation is similar, approximately 290% of $LiC_6$. Although the initial potential is reduced to about 1.0 volts, this voltage value is still above the value where intercalation occurs. The results show that oxidation of the graphite does not reduce the solvent decomposition reaction. For the phosphorus modified graphite, the total charge passed after intercalation was equivalent to about 200% of $LiC_6$. The amount of solvent decomposition gassing reactions has been reduced from a value equivalent to 170% of $LiC_6$ to 100% of $LiC_6$ or the gassing reactions have been reduced by approximately 40% [(1-(100/170))*100]. The chlorine modified graphite produced the best results. The amount of solvent decomposition reactions was reduced by approximately 70% [(1-(50/170))*100].

EXAMPLE 4

The configuration of the electrochemical cells of this invention can incorporate the features of the cell shown in "Heat Transfer Phenomena in Lithium/Polymer-Electrolyte Batteries for Electric Vehicle Application", Yufei Chen and James W. Evans, J Electrochem. Soc., Vol. 140, No. 7, July 1993, 1883-1838 This cell is shown in FIG. 2 herein. As shown in FIG. 2, the cell consists of a lithium negative electrode (consisting of lithium, chemically modified graphite and a PVDF binder), polymer electrolyte (polyethylene oxide containing a lithium salt) and composite positive electrode (containing $MnO_2$), as well as bipolar connector/current collectors. A battery/stack is composed of many parallel-connected units, and each unit is composed of many series-connected, bipolar cells. This design is adopted in the Harwell prototype and is expected to exhibit high specific energy (see A. Hooper, in Solid-State Batteries, C.A.C. Sequeira and A. Hooper, Editors, p. 399, NATO ASI Series, Martinus Nijhoff, Amsterdam (1985) relating to the Hartwell Prototype)

What is claimed is:

1. Chemically modified graphite particles that are chemically modified at the edge planes of the graphite with fluorine, chlorine, iodine or phosphorus to reduce the decomposition of an organic aprotic solvent when the particles are used in an electrode of a graphite/alkali metal electrolytic cell containing said solvent.

2. Chemically modified graphite particles as claimed in claim 1 wherein:
   (i) the particles have an average size from 2 microns to 40 microns with essentially no particles having a particle size greater than 50 microns; and
   (ii) the particles are chemically modified with from 20 parts per million to 500 parts per million of fluorine.

3. Chemically modified graphite particles as claimed in claim 1 wherein:
   (i) the particles have an average size from 2 microns to 40 microns with essentially no particles having a particle size greater than 50 microns; and
   (ii) the particles are chemically modified with from 20 parts per million to 500 parts per million of chlorine.

4. Chemically modified graphite particles as claimed in claim 1 wherein:
   (i) the particles have an average size from 2 microns to 40 microns with essentially no particles having a particle size greater than 50 microns; and
   (ii) the particles are chemically modified with from 20 parts per million to 500 parts per million of iodine.

5. Chemically modified graphite particles as claimed in claim 1 wherein:
   (i) the particles have an average size from 2 microns to 40 microns with essentially no particles having a particle size greater than 50 microns; and
   (ii) the particles are chemically modified with from 300 parts per million to 5000 parts per million of phosphorus.

6. Chemically modified graphite particles as claimed in claim 1 wherein the graphite has a degree of graphitization of about 1 and is chemically modified with chlorine.

7. An electrode for a graphite/alkali metal electrochemical cell comprising: (i) chemically modified graphite particles that are chemically modified at the edge planes of the graphite with fluorine, chlorine, iodine or phosphorus to reduce the decomposition of an organic aprotic solvent when the particles are used in a graphite/alkali metal electrochemical cell containing such solvent and (ii) a binder.

8. An electrode as claimed in claim 7 wherein the chemically modified graphite particles:

(i) have an average size from 2 microns to 40 microns with essentially no particles having a particle size greater than 50 microns; and
   (ii) are chemically modified with from 20 parts per million to 500 parts per million of fluorine.

9. An electrode as claimed in claim 7 wherein the chemically modified graphite particles:

(i) have an average size from 2 microns to 40 microns with essentially no particles having a particle size greater than 50 microns; and
   (ii) are chemically modified with from 20 parts per million to 500 parts per million of chlorine.

10. An electrode as claimed in claim 7 wherein the chemically modified graphite particles:

(i) have an average size from 2 microns to 40 microns with essentially no particles having a particle size greater than 50 microns; and
    (ii) are chemically modified with from 20 parts per million to 500 parts per million of iodine.

11. An electrode as claimed in claim 7 wherein the chemically modified graphite particles:

(i) have an average size from 2 microns to 40 microns with essentially no particles having a particle size greater than 50 microns; and
    (ii) are chemically modified with from 300 parts per million to 5000 parts per million of phosphorus.

12. An electrode as claimed in claim 7 wherein the graphite has a degree of graphitization of about 1 and is chemically modified with chlorine.

13. A graphite/alkali metal electrochemical cell comprising:

(i) an electrode comprising a binder and graphite particles that are chemically modified at the edge planes of the graphite with fluorine, chlorine, iodine or phosphorus to reduce the decomposition of an organic aprotic solvent in the cell,
    (ii) a solution comprising the organic aprotic solvent and an electrically conducting salt of an alkali metal, and
    (iii) a counterelectrode.

14. An electrochemical cell as claimed in claim 13 wherein:

(a) the chemically modified graphite particles in the electrode:
       (i) have an average size from 2 microns to 40 microns with essentially no particles having a particle size greater than 50 microns; and
       (ii) are chemically modified with from 20 parts per million to 500 parts per million of chlorine,
    (b) the electrode is the anode and the counterelectrode is the cathode; and
    (c) the counterelectrode comprises $MoS_2$, $V_6O_{13}$, $CoO_2$ or $MnO_2$ and a binder.

15. An electrochemical cell as claimed in claim 13 wherein:

(a) the chemically modified graphite particles in the electrode:
       (i) have an average size from 2 microns to 40 microns with essentially no particles having a particle size greater than 50 microns; and
       (ii) are chemically modified with from 20 parts per million to 500 parts per million of fluorine;
    (b) the electrode is the anode and the counterelectrode is the cathode; and
    (c) the counterelectrode comprises $MoS_2$, $V_6O_{13}$, $CoO_2$ or $MnO_2$ and a binder.

16. An electrochemical cell as claimed in claim 13 wherein:

(a) the chemically modified graphite particles in the electrode:
       (i) have an average size from 2 microns to 40 microns with essentially no particles having a particle size greater than 50 microns; and
       (ii) are chemically modified with from 20 parts per million to 500 parts per million of iodine;
    (b) the electrode is the anode and the counterelectrode is the cathode; and
    (c) the counterelectrode comprises $MoS_2$, $V_6O_{13}$, $CoO_2$ or $MnO_2$ and a binder.

17. An electrochemical cell as claimed in claim 13 wherein:

(a) the chemically modified graphite particles in the electrode:
       (i) have an average size from 2 microns to 40 microns with essentially no particles having a particle size greater than 50 microns; and
       (ii) are chemically modified with from 300 parts per million to 500 parts per million of phosphorus;
    (b) the electrode is the anode and the counterelectrode is the cathode; and
    (c) the counterelectrode comprises $MoS_2$, $V_6O_{13}$, $CoO_2$ or $MnO_2$ and a binder.

18. An electrochemical cell as claimed in claim 13 wherein the organic aprotic solvent is at least one alkyene or dialkyl carbonate and electrolytically conductive salt is $LiAsF_6$, $Li_2MnO_4$ or $LiCoO_2$.

19. An electrochemical cell as claimed in claim 13 wherein the organic aprotic solvent is polyethylene oxide or polyacrylonitrile and the electrolytically conductive salt is $LiAsF_6$, $Li_2MnO_4$ or $LiCoO_2$.

20. An electrochemical cell as claimed in claim 13 wherein the electrode is an anode containing reversibly intercalated lithium in the graphite and the counterelectrode is a cathode comprising a metal oxide having lithium reversibly incorporated therein.

21. A graphite/alkali metal electrochemical cell as claimed in claim 13 wherein the graphite has a degree of graphitization of about 1 and is chemically modified with chlorine.

* * * * *